June 2, 1953 P. R. AIGRAIN ET AL 2,640,880

SPEECH COMMUNICATION SYSTEM

Filed July 24, 1948 4 Sheets-Sheet 1

INVENTORS
PIERRE R. AIGRAIN
JEAN B. LAIR

BY R.P. Morris

ATTORNEY

SPEECH COMMUNICATION SYSTEM

Filed July 24, 1948 4 Sheets-Sheet 2

INVENTORS
PIERRE R. AIGRAIN
JEAN B. LAIR
BY
R. P. Morris
ATTORNEY

June 2, 1953 P. R. AIGRAIN ET AL 2,640,880

SPEECH COMMUNICATION SYSTEM

Filed July 24, 1948 4 Sheets-Sheet 3

INVENTORS
PIERRE R. AIGRAIN
JEAN B. LAIR
BY
[signature]
ATTORNEY

SPEECH COMMUNICATION SYSTEM

Filed July 24, 1948 4 Sheets-Sheet 4

INVENTORS
PIERRE R. AIGRAIN
JEAN B. LAIR
BY
R P Morris
ATTORNEY

Patented June 2, 1953 2,640,880

UNITED STATES PATENT OFFICE 2,640,880

SPEECH COMMUNICATION SYSTEM

Pierre Raoul Aigrain, New York, N. Y., and Jean-Baptiste Lair, Nutley, N. J., assignors to International Standard Electric Corporation, New York, N. Y., a corporation of Delaware Application July 24, 1948, Serial No. 50,516

5 Claims. (Cl. 179—1.5)

This invention relates to communication systems, and more particularly to communication systems in which a harmonic analysis is performed on the signal to be transmitted.

The system is in some respects similar to the system described in U. S. Patent 2,151,091 issued to Homer W. Dudley, which makes use of the vocoder. The harmonic analyzer of the present invention differs fundamentally from the vocoder, however. Although as indicated by the above-mentioned patent Dudley was fully aware of the carrier nature of speech, and understood that voiced speech sounds consist of a plurality of harmonically related carriers simultaneously modulated in frequency and amplitude at a relatively slow rate (not greater than 25 cycles per second), the means and method described by Dudley does not attempt to measure the amplitudes of the individual harmonic components of the speech signal, but rather the amount of energy transmitted through a number of fixed tuned filters. Even if the number of filters in the vocoder were greatly increased, it would not constitute a harmonic analysis transmission system.

It is accordingly an object of the present invention to provide a harmonic analysis transmission system in which the amplitudes of the different harmonics of the speech signals are measured and signals indicative of said amplitudes are transmitted instead of said speech.

It is another object of the invention to provide a filter which is automatically tunable in response to a control signal, and which may be conveniently utilized in the analysis of speech waves.

In accordance with a feature of the invention, means responsive to the fundamental frequency component of a given speech signal are utilized to tune a plurality of harmonically related filters in such a manner that each filter has within its pass band one harmonic component of said speech, the relatively slowly varying output of said filters are measured, and said fundamental frequency component and the results of said measurements are transmitted in place of said speech.

In accordance with another feature of the invention, a receiver is provided comprising means including a plurality of automatically tunable filters, each tuned to a harmonic of the fundamental frequency component of the speech signal, a plurality of modulators each responsive to a corresponding one of the above-mentioned measured filter outputs, means for generating harmonics of said fundamental frequency component, means for applying said harmonics to said modulators, and means for combining the outputs of said modulators to reproduce said speech.

The above-mentioned and other objects and features of the invention and the manner of attaining them will become more apparent and the invention itself will be best understood by reference to the following description of an embodiment of the invention taken in conjunction with the accompanying drawings wherein.

Figure 1:
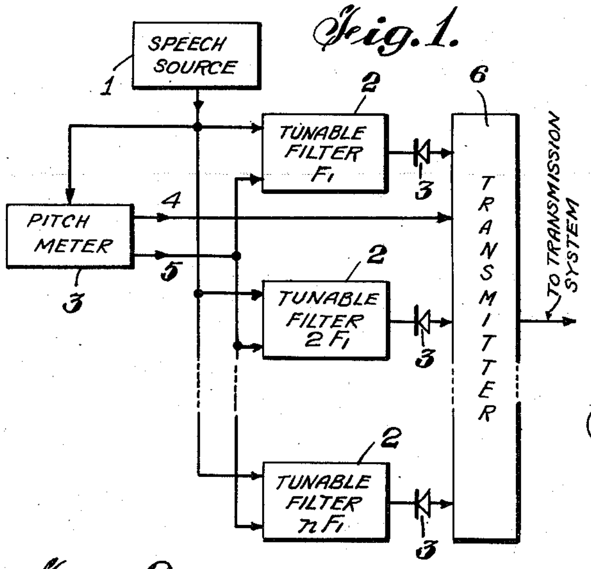
Figure 1 is a block diagram which will be utilized in outlining certain principles of the invention.

Referring now more particularly to Figure 1, we show a speech source 1, the output of which is applied to a plurality of suitable filters 2 which are respectively tuned to frequencies F, 2F, . . ., $n$F. The output of speed source 1 is also applied to a pitch-meter 3, which is an instrument which separates the fundamental frequency component of a voiced speech wave from the other frequency components of said wave. Such devices are well-known and will not be discussed here. Any of the known types may be used.

The output of the pitch-meter 3 consists of two different signals, one of which is a sine wave of constant amplitude with a frequency equal to the frequency of the fundamental frequency component of the speech wave. The other output signal derived from the pitch meter is a voltage proportioned to the frequency of the previously mentioned fundamental frequency component.

The second output is obtained by means of a frequency discriminator from the first mentioned output of the pitch-meter. The fundamental frequency appears on line 4 and the voltage proportional to said frequency appears on line 5. The output which appears on line 5 is applied to control means associated with the tunable filters 2 to control the locations of the pass bands of said tunable filters. It is to be emphasized that Figure 1 is merely a schematic functional diagram and the actual means for carrying out the indicated operations will be described more fully later. The pitch-meter 3 also includes means to recognize whether the output of the speech source 1 is a voiced or an unvoiced wave, and in case the wave is unvoiced to apply a characterizing frequency of approximately 50 cycles per second to line 4 and a voltage proportional to said frequency of 50 cycles per second to line 5. The outputs of the tunable filters 2 are individually rectified in corresponding rectifiers indicated schematically at 3. The voltage developed at the output of each of said rectifiers is accordingly proportional to the amplitude of the corresponding harmonic component of the original speech wave. These rectified voltages, together with the fundamental frequency on line 4, are applied to a transmitter 6, which performs the required operation of multiplexing, modulating, and transmitting the developed voltage indications.

In practice, approximately thirty tunable filters 2 are required in order to cover the most important frequency components present in the human voice and provide acceptable telephone quality. Higher quality may be attained by the use of a larger number of filters. The signals applied to the transmitter 6 vary at a relatively slow rate (less than about 25 cycles per second). Thirty such signals can, accordingly, be transmitted in a frequency bandwidth of approximately 750 cycles per second by known methods of multiplexing. The signals can be transmitted by frequency division or by time division, and by any suitable method of modulation. In particular, it is to be noted that the method of pulse code modulation is particularly applicable in view of the fact that harmonic distortion is considerably less objectionable than crosstalk and intermodulation distortion. An 8 level, 3 unit code is suitable for transmitting the output of each of the tunable filters. The code group repetition rate is set at approximately 50 code groups per second for each filter output. It is preferable to use a larger number of units in the code group which is utilized for transmitting the fundamental frequency obtained from line 4, and approximately 7 units, corresponding to 128 levels, is suitable for that purpose. The total number of pulses to be transmitted per sampling is accordingly $3\times30+7$, or 97. This number of pulses is transmitted 50 times per second, which means that a total of 4,850 pulses are transmitted per second. This requires a bandwidth of approximately 2,500 cycles per second. Thus by harmonic analysis transmission, the important signal to noise improvement associated with pulse code modulation is obtained in a bandwidth less than that normally required for single side band amplitude modulation.

Alternatively, quantization may be used without coding, particularly for the transmission of the harmonic amplitudes. This requires that the corresponding amplitude modulated pulses assume one of 8 distinct possible values. The bandwidth requirement is then approximately 900 cycles per second. But the full advantages of PCM in the reduction of noise are of course not realized.

Figure 2:
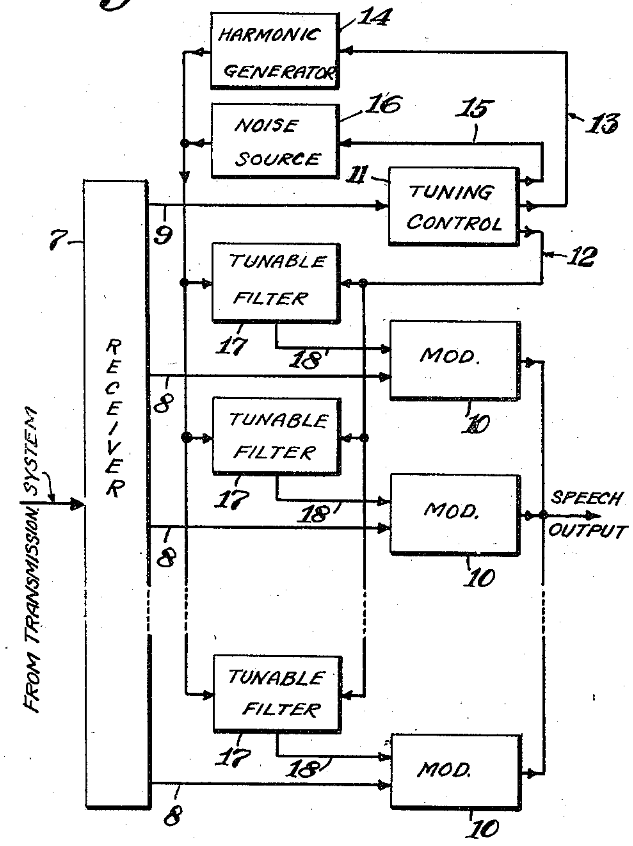
Figure 2 is a block diagram indicative of certain features of the invention as employed at a receiver.

We refer now to Figure 2 in which we show a schematic diagram illustrative of the principles of our invention as applied to a receiver. The signals transmitted according to Figure 1 are received from the transmission system by a receiver 7 in Figure 2. The receiver 7 functions to demodulate and distribute the various channels to the output lines 8 and 9. Each of the lines 8 goes to a corresponding modulator 10, and the voltages appearing on the lines 8 are the same voltages as those received from the rectifiers indicated schematically at 3 in Figure 1. On line 9 appears a frequency equal to the fundamental frequency component if the signal being received is voiced, and equal to approximately 50 cycles per second if the signal is unvoiced. The frequency which appears on line 9 is applied to tuning control circuit 11 which contains frequency discriminating means to develop a voltage proportional to the input frequency. This voltage is applied to line 12. The tuning control circuit also acts to determine whether the frequency obtained from line 9 is greater than approximately 50 cycles per second or not, corresponding to whether the speech is voiced or unvoiced. If the frequency is greater than approximately 50 cycles per second, said frequency is passed on through the tuning control circuit to line 13 and to harmonic generator 14. If instead the frequency on line 9 is approximately 50 cycles per second, a marking voltage is applied to line 15, which activates a noise source 16. Thus, when a frequency is received over line 9, either the harmonic generator 14 or the noise source 16 will be activated. The outputs of circuits 14 and 16 are combined and applied to the tunable filters 17 which are tuned in accordance with the voltage on line 12.

It will be recognized that each of the tunable filters 17 is tuned to a different one of the harmonics generated by harmonic generator 14 in accordance with the control voltage on line 12. The output of each of the filters 17 is applied via a corresponding line 18 to a corresponding modulator 10, where the harmonic passed by the filter is amplitude modulated by the voltage applied over line 8. The outputs of the modulators 10 are combined to form the required speech output.

Figure 3:
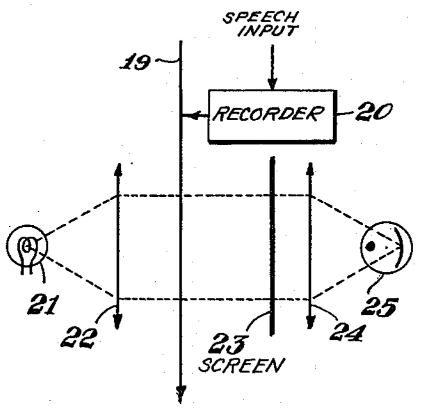
Figure 3 is a schematic diagram which will be used in explaining the principle of the tunable filters utilized in the present invention.

We refer now to Figure 3 which will be used in describing the filter utilized in our invention. The characteristic of a filter is usually specified by its complex transfer admittance $A(\omega)$, in terms of which the output $V(t)$ of the filter in response to an input $F(t)$ can be written:

$$V(t)=T^{t}{}_{\omega}[A(\omega)T_{t}^{\omega}F(t)]$$

However, in this connection, it is often useful to define a filter in terms of its indicial admittance $g(t)$:

$$g(t)=\frac{1}{\sqrt{2\pi}}T^{t}{}_{\omega}A(\omega)$$

which has the advantage of being a real function, such that $g(t)$ is zero for $t$ less than zero.

The output $V(t)$ is then given in terms of $g(t)$ by:

$$V(t)=\int_0^\infty g(x)F(t-x)dx$$

Thus, the action of an electrical filter can be interpreted in terms of the integration of the product of a signal to be filtered and the indicial admittance of the filter. The diagram shown in Figure 3 is an illustration of how this integration may be carried out optically. Let it be assumed that the signal $F(t)$ is continuously recorded on a film 19 by means of a recorder 20. Let it be further assumed that the film 19 is driven by means not shown at a velocity $s$. The recording is of the variable opacity type, so that at any time $t$ the opacity of the recording is a function of the space variable $x$, and is equal to $$F\left(t-\frac{x}{s}\right)$$

Light from source 21 is focussed by lens 22 and transmitted through recording 19 and through a variable opacity screen 23, the opacity of which is varied according to $$g\left(\frac{x}{s}\right)$$

The total light transmitted will be:

$$V(g)=\int_0^\infty g\left(\frac{x}{s}\right)F\left(t-\frac{x}{s}\right)d\left(\frac{x}{s}\right)$$

This light is focussed by means of lens 24 and collected by photocell 25; the output $V(t)$ is equal to the output of a filter of indicial admittance $$g\left(\frac{x}{s}\right)$$

with an input signal $F(t)$. Varying $s$ is equivalent to changing the scale of $x$, which in turn is equivalent to changing the scale of $\omega$. Thus, it is possible to tune the equivalent filter by varying the speed $s$ of the recording film. A plurality of screens 23 may be placed side by side in such a way as to be simultaneously illuminated by the same record. If they are equivalent to harmonically tuned filters at one particular speed $s$, they will remain harmonically tuned for all recording speeds. Hence it is possible to keep them tuned to each of the harmonics of the speech signal. All that is required is that one period of $F(t)$ shall be made to occupy always the same length of recording.

Figure 4A:
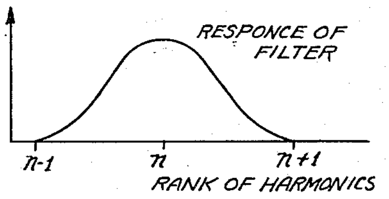
Figure 4 shows two graphs relative to the design of the filters.
Figure 4B:
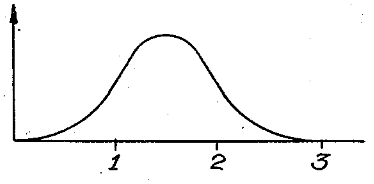

Theoretically, the length of record in the machine should extend to infinity. It is found, however, that only 2.8 periods of $F(t)$ must be simultaneously present in the apparatus. This is illustrated in Figure 4A. Figure 4B shows a suitable amplitude characteristic for the filter. The corresponding $g_n(x)$ is of the form:

$$g_n(x)=G(x)\cos \eta\chi$$

$G(x)$ is less than 0.01 for $x$ greater than $2.8(2\pi)$.

The apparatus shown in Figure 3 is equivalent to a tuned filter. In order to obtain the amplitude of the harmonic to be transmitted it is necessary to rectify the output of photocell 25. There is, however, an equivalent procedure which is convenient for multi-channel operations. In this connection we utilize two filters for each harmonic, with opacity varying according to:

$$g_{nc}(x)=G(x)\cos nx$$
$$g_{ns}(x)=G(x)\sin nx$$

The output of the $g_{nc}$ filter is $A_{nc}$, and the output of the $g_{ns}$ filter is $A_{ns}$. Then the amplitude of the $n$th harmonic of the input signal becomes:

$$A_n=\sqrt{A_{ns}^2+A_{nc}^2}$$

Circuits for carrying out this operation are well known. The advantage of this method is that the operation is instantaneous. In fact, if the recorder is working continuously it is sufficient that the record be illuminated by a light impulse of very short duration in order to measure $A_n$ at the given time instantaneously.

Inasmuch as the maximum rate at which $A_n$ can vary is less than about 25 cycles per second, $A_n$ is determined if it is known 50 times a second. Namely, if a series of uniformly spaced pulses of amplitude proportional to $A_n$ at their time of occurrence, and having a pulse repetition frequency of 50 per second are fed to a low pass filter having a 25 cycles per second cut-off frequency, the output will be identically $A_n$. It is thus possible to completely analyze the speech signal by illuminating the record 50 times a second for a brief period of time each illumination. This leaves all the analyzer, except the recorder, idle for most of the time. It is accordingly possible to use the analyzer for a plurality of simultaneously speech signals. Each speech signal must be provided with a separate recorder and light source. The light sources are turned on in rapid succession, 50 times per second. The output of the analyzer consists of a time-divided pulse amplitude modulated signal, and the different channels may be transmitted by multiplexing in accordance with known methods.

Figure 5:
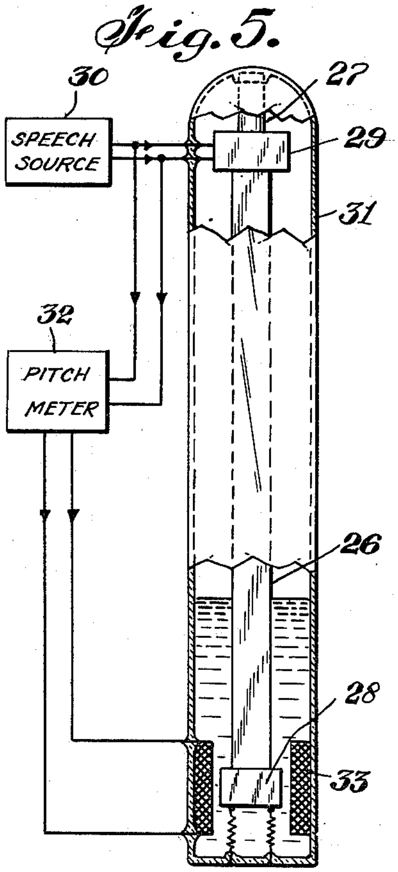
Figure 5 shows in schematic form a diagram of a recording mechanism used in conjunction with the above-mentioned filters.

We turn now to Figure 5 for a description of the recorder which is employed in our invention. In Figure 5 we show a flat aluminum ribbon 26 about 25 centimeters long, maintained under tension between a post 27 and an electromagnet 28 applying a variable tension to the ribbon. The upper end of the ribbon 26 is rotated in accordance with the speech signals by means of an electromagnetic transducer 29 which is activated by speech signals from speech source 30. The lower 10 centimeters of the ribbon is placed in a viscous fluid and is used as a matching load for the useful part of the ribbon for which the damping is maintained very small by evacuating envelope 31. The output of source 30 is also applied to pitch-meter 32 which applies a voltage to coil 33 of electromagnet 28 which is proportional to the frequency of the fundamental frequency component of the speech; or, in case the sound is an unvoiced sound, is proportional to a frequency of about 50 cycles per second. The tension of the ribbon 26 is accordingly varied in accordance with the frequency of the fundamental frequency component of the speech wave, and the speed at which the signal applied to the upper end of the ribbon through the electromechanical transducer 29 propagates along ribbon 26 is proportional to this tension. The recording produced by the instrument shown in Figure 5 is accordingly a short term recording consisting of traveling waves on transmission medium 26.

Figure 6:
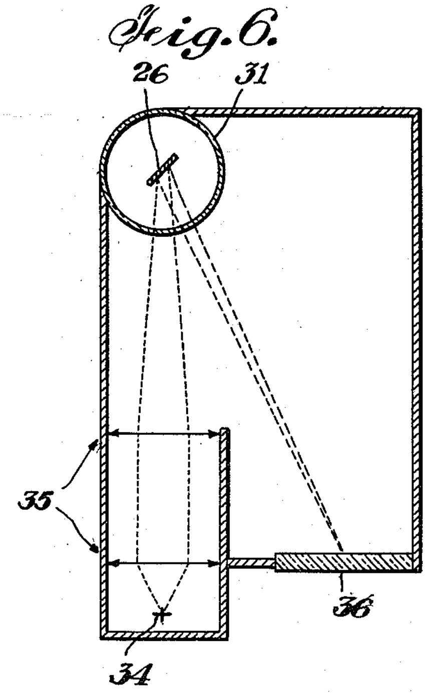
Figure 6 is a view illustrating certain features of the above-mentioned recording mechanism.

As shown in Figure 6 the upper portion of ribbon 26 is made part of an optical system which projects the image of a light source 34, such as a neon flash tube, through lens system 35 onto a screen 36. Mechanical displacement of ribbon 26 causes the image on screen 36 to move in accordance with the displacement. The opacity of the screen 36 is varied from left to right, and as a result the light transmitted through screen 36 is of variable intensity in accordance with the input speech signals. Moreover, time variations in the input speech signal are translated into space variations vertically along the screen 36; i. e., a recording is produced.

The inertia of the aluminum bar is small, so that it is possible to drive it at a frequency up to and exceeding 4,000 cycles per second. The damping from external causes within envelope 31 is small due to the fact that the envelope is evacuated. The internal damping of the aluminum is very small, inasmuch as an aluminum bar has a Q greater than 40,000. Furthermore, damping can be readily compensated for by changing the function $G(x)$.

Figure 7:
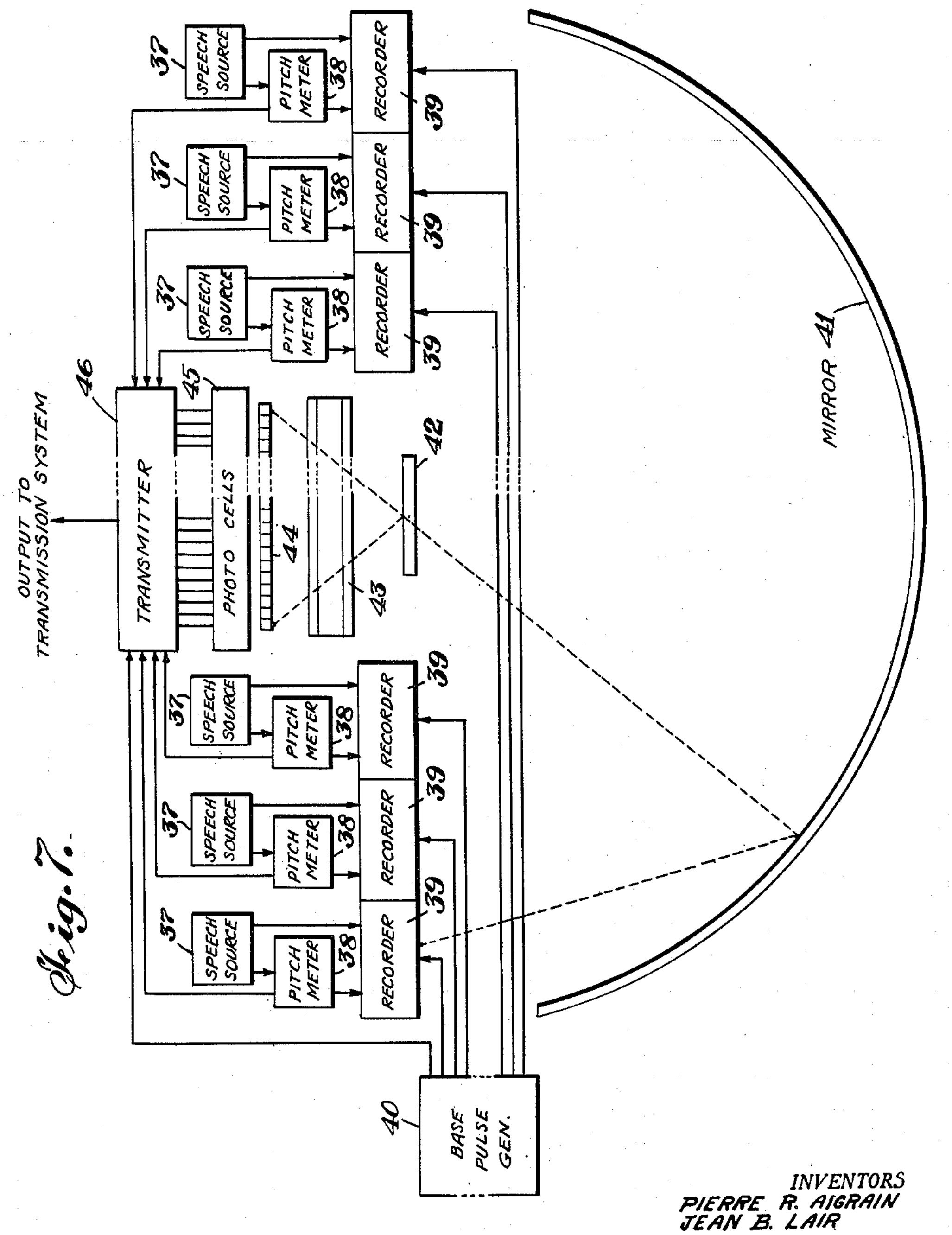
Figure 7 shows in more detailed form certain aspects of the communication system illustrated in Figure 1.

The recorder shown in Figures 5 and 6 is utilized as one of the elements of each of a plurality of speech channels in a multichannel speech communication system. A diagram of the system is shown in Figure 7. A plurality of speech sources 37, each with its associated pitch-meter 38 and recorder 39 are sequentially switched by means of gating pulses derived from base pulse generator 40 into a communication channel comprising mirror 41, an opalescent screen 42, a cylindrical lens 43, a plurality of films 44 of variable opacity in accordance with desired filter characteristics, a bank of photocells 45, and a transmitter indicated schematically at 46. There is one cosine and one sine screen 44 for each of the 30 harmonic frequency components of the input speech, making 60 screens in all. There are a corresponding number of photocells, one for each of the 60 filter screens 44. The output of each photocell is fed to the transmitter 46. The transmitter 46 includes squaring and addition circuits which are utilized in obtaining from a pair of sine and cosine photocells a single amplitude as outlined in the foregoing discussion in connection with Figure 3. The output of the photocells may be taken in time-division multiplex, in which case only one set of squaring and addition circuits is required for all the 30 harmonic amplitudes.

The fundamental frequency component of the speech in each channel is obtained from the corresponding pitch-meter 38 and is also fed to the transmitter 46. These frequencies are transmitted by conventional methods, i. e., by transmitting the frequencies themselves, or by transmitting voltages proportional to these frequencies, or by any other known means. Synchronizing pulses for synchronizing the output of each pitch-meter with the output of the corresponding recorder are derived from base pulse generator 40 and applied to transmitter 46 for the case in which the transmission is by pulse modulation.

Figure 8:
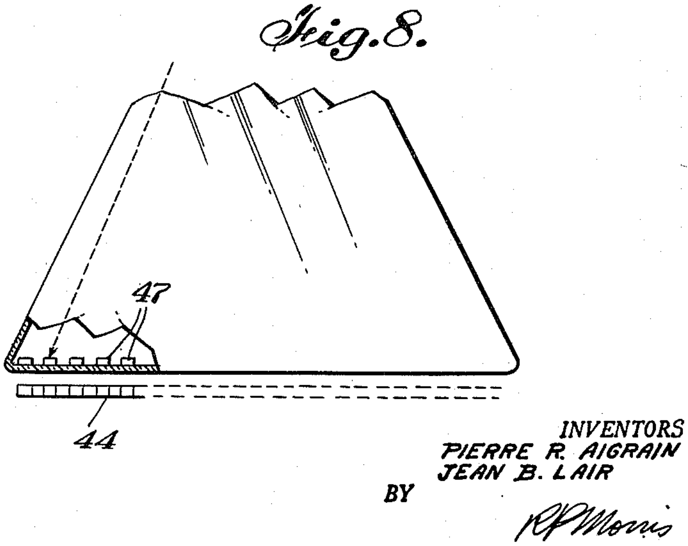
Figure 8 shows a modification of a portion of Figure 7.

Although the photocells shown at 45 may be of any known type, a problem of crowding can occur in attempting to place sixty photocells in such a small space. In one embodiment of our invention, in order to overcome this difficulty, we employ a modified iconoscope consisting of 60 elementary photocells in the same envelope, connected in time succession to the output circuit by means of a scanning beam. The different harmonic amplitudes are thus obtained for each channel as a time-divided amplitude modulated pulse train. As has been mentioned heretofore, squaring and addition circuits are employed to obtain a single voltage from the two sine and cosine voltages. If, however, the photocells are designed to have a response proportional to the square of the input light, only very simple addition circuits need then be used. The modified iconoscope containing the elementary photocells is indicated schematically in Figure 8. The individual photocells 47 are shown behind the screen 44.

Figures 9, 10:
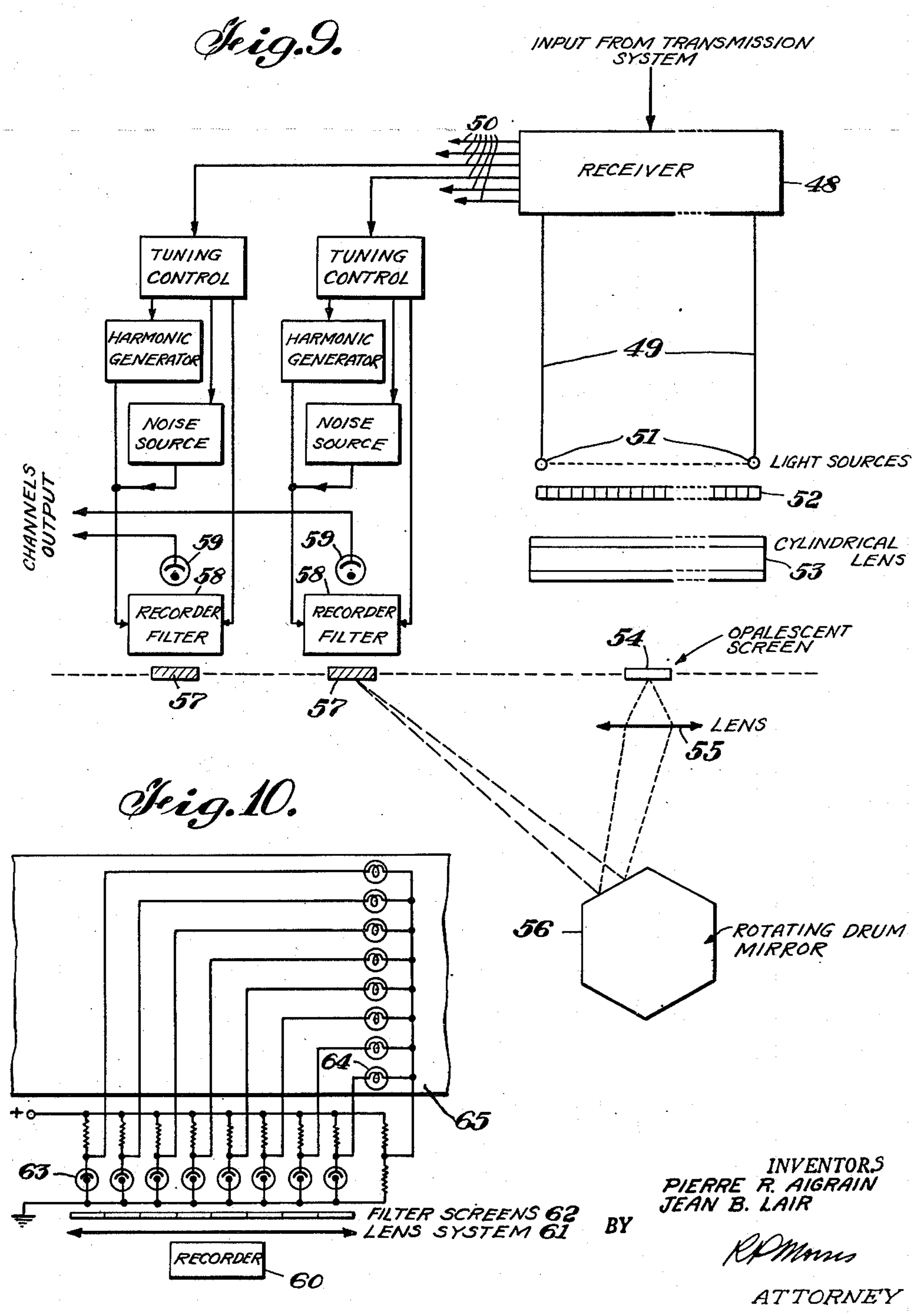
Figure 9 shows in schematic form certain of the detailed features of a receiver in accordance with Figure 2.
Figure 10 shows in schematic form details of a device for the production of visible speech.

Referring now to Figure 9 we show a receiver suitable for use in conjunction with the analysing device and transmitter of Figure 7, together with associated speech remaking circuits. The input from the transmission system is applied to a receiver which consists of necessary amplifiers, demodulators, distributors, and so on, to produce in sequence for each channel simultaneous outputs on line 49 corresponding to the harmonic amplitudes obtained from the speech analysing device shown in Figure 7. The receiver also produces on lines 50 a plurality of frequencies each equal to a corresponding one of the fundamental frequency components of the individual speech channels. As shown in Figure 9, the output voltages developed on line 39 are applied to light sources 51 which are therefore illuminated simultaneously for each channel. The light produced by light sources 51 passes through filter screens 52 similar to those of Figure 7, and is then focussed by means of cylindrical lens 53 on opalescent screen 54 and then via lens 55 and rotating mirror 56 (which is synchronized by means not shown to the repetition rate of 50 per second), on phosphor-coated screen 57. The light then passes through a recorder-filter 58 identical with those shown in Figures 5 and 6, on to a photocell 59. It will be recognized that the receiving system shown in Figure 9 is identically that of the transmitting system shown in Figure 7, with the light sources and the photocells interchanged, and with the added condition that the light sources 51 are modulated in intensity and the output channels are illuminated sequentially by means of a distributor embodied in rotating drum mirror 56. A possible additional modification occurs in the phosphor-coated screens 57, in that in order to produce a continuous light input into the recorder-filter 58, the face of each channel screen is coated with a phosphor of suitable decay time (approximately $\frac{1}{25}$ of a second), which acts as a low pass filter with a 25 cycles per second cut-off. The speech-remaking device of Figure 9 thus comprises, in addition to the optical system, 30 photocells and one travelling wave recorder and photocell per channel.

Another application of the harmonic analyzer either in the tuned or untuned form, is the realization of visible speech apparatus. This application of the invention is shown in Figure 10, which represents essentially a one channel untuned analyzer. Voice signals are applied from a source not shown to the recorder 60, and the output of the recorder is projected via lens system 61 onto a filter screen 62. Only one filter screen is used for each frequency band, and the light source in the recorder is kept on at all times. The photocells 63 placed behind each screen may be of the photo-resistive type, or they may be low sensitivity bolometers each consisting of part of a bridge, as shown. Each cell controls a small light source 64 and the bridge is so adjusted that these lights are just off when no signal is applied. Upon application of a signal to the recorder 60 each light will shine according to the power present in the corresponding frequency band. These lights excite corresponding sections of a phosphorescent moving belt 65 which carries the visible speech information in conventional manner.

While we have described the principles of our invention in connection with specific apparatus, it is to be clearly understood that this description is made only by way of example and not as a limitation on the scope of our invention.

We claim:

1. A communication system comprising a source of speech waves, a plurality of automatically tunable band pass filters, means for producing a control voltage proportional to the frequency of the fundamental frequency component of said speech waves, means responsive to said control voltage to tune each of said filters to pass a corresponding harmonic component of said waves, means deriving from the output of each of said filters a voltage proportional to the amplitude of the corresponding harmonic, and means for transmitting signals indicative of such control voltage and said derived voltages.

2. A communication system according to claim 1, further comprising a receiver for said transmitted signals, said receiver comprising means responsive to said control voltage for producing a plurality of harmonically related waves having frequencies proportional to said control voltage, a second plurality of automatically tunable band pass filters, means for applying said harmonically related frequencies to said second plurality of filters, means responsive to said control voltage to tune each of said second plurality of filters to a corresponding one of said harmonically related frequencies, a plurality of modulators, means for modulating the output of each of said second plurality of filters in a corresponding one of said modulators by a corresponding one of said derived voltages, and means for combining the output of said modulators to reproduce said speech.

3. An electrical translator comprising a source of speech waves, means for producing a control voltage proportional to the frequency of the fundamental frequency component of said waves, a transmission medium having a light reflecting surface and capable of propagating mechanical waves, means for applying said waves to said transmission medium, means associated with said transmission medium for controlling the velocity of propagation of said waves in response to said control voltage, a source of light and means for controlling the intensity of said source according to the amplitude of said mechanical waves, a screen having an opacity variable in accordance with a desired filter characteristic, means for focussing the light from said source on said screen and means for collecting the light transmitted by said screen.

4. An electrical translator comprising a source of speech waves, means for producing a control voltage proportional to the frequency of the fundamental frequency component of said waves, a transmission medium having a light reflecting surface and capable of propagating mechanical waves, means for applying said waves to said transmission medium, means associated with said transmission medium for controlling the velocity of propagation of said waves in response to said control voltage, a source of light and a screen of variable opacity, means for focussing said light on said screen via said surface to produce a variable intensity light recording, a second screen having an opacity variable in accordance with a desired filter characteristic, means for focussing the light transmitted by said first screen on said second screen, and means for collecting the light transmitted by said second screen.

5. A communication system comprising a source of speech waves, means for deriving a control voltage proportional to the frequency of the fundamental frequency component of said waves, a transmission medium having a light reflecting surface and capable of propagating mechanical waves at a controllable velocity, a transducer for converting said speech waves into mechanical waves on said medium, means responsive to said control voltage to control said velocity, a light source and a screen of variable opacity, means for focussing said light via said reflecting surface on said screen, a plurality of secondary screens each having an opacity variable in accordance with a corresponding predetermined filter characteristic, means for focussing the light transmitted by said first screen on said secondary screens, means for individually collecting the light transmitted by each of said secondary screens, a photocell associated with each of said secondary screens for deriving a voltage proportional to said collected light, and means for transmitting the output of said photocells and said control voltage.

PIERRE RAOUL AIGRAIN.
JEAN-BAPTISTE LAIR.

References Cited in the file of this patent

UNITED STATES PATENTS

| Number | Name | Date |
|---|---|---|
| 2,098,956 | Dudley | Nov. 16, 1937 |
| 2,121,142 | Dudley | June 21, 1938 |
| 2,151,091 | Dudley | Mar. 21, 1939 |
| 2,183,248 | Riesz | Dec. 12, 1939 |
| 2,213,320 | Mathes et al. | Sept. 3, 1940 |
| 2,408,692 | Shore | Oct. 1, 1946 |